United States Patent

[11] 3,539,016

[72] Inventors James J. Bauer,
Gwinner, and
Dennis E. Lindemann, Lisbon, North Dakota
[21] Appl. No. 671,328
[22] Filed Sept. 28, 1967
[45] Patented Nov. 10, 1970
[73] Assignee By mesne assignments, to
Clark Equipment Company,
Buchanan, Mich.,
a corporation of Delaware

[54] ACTUATING MEANS FOR FOLDABLE IMPLEMENT CARRIAGE
5 Claims, 9 Drawing Figs.
[52] U.S. Cl. .................................................... 172/311, 172/456, 280/411
[51] Int. Cl. .................................................... A01b 73/00
[50] Field of Search ........................................... 172/311, 456, 501; 280/411, 411.1

[56] References Cited
UNITED STATES PATENTS
2,363,292 11/1944 Brown ........................... 172/501X
2,541,964 2/1951 Hennings ....................... 172/501X
2,750,724 6/1956 Stephenson .................... 172/456
2,828,597 4/1958 Moore ........................... 172/456X
2,995,385 8/1961 Lohrman et al. ............... 172/456X
3,021,908 2/1962 Olugosch ....................... 172/456X
3,428,333 2/1969 Nelson .......................... 172/456X Primary Examiner—Robert E. Pulfrey
Assistant Examiner—Alan E. Kopecki
Attorney—Frederick E. Lange, John J. Held, Jr. and Eugene L. Johnson ABSTRACT: The invention relates to a hydraulically actuated foldable carriage for an earth working implement. The carriage may be folded from a wide field position to a narrow transport or storage position. It includes features which prevent damage if movement between the field position and the transport position is attempted with the implement carriage in an improper condition. It also includes features which allow a partial lifting of the implement and, at the same time, allow forward movement of the carriage to thereby clean debris from the implement teeth. The invention also includes an improved cable yoke design which avoids stress in the cable yoke when the cables are under tension.

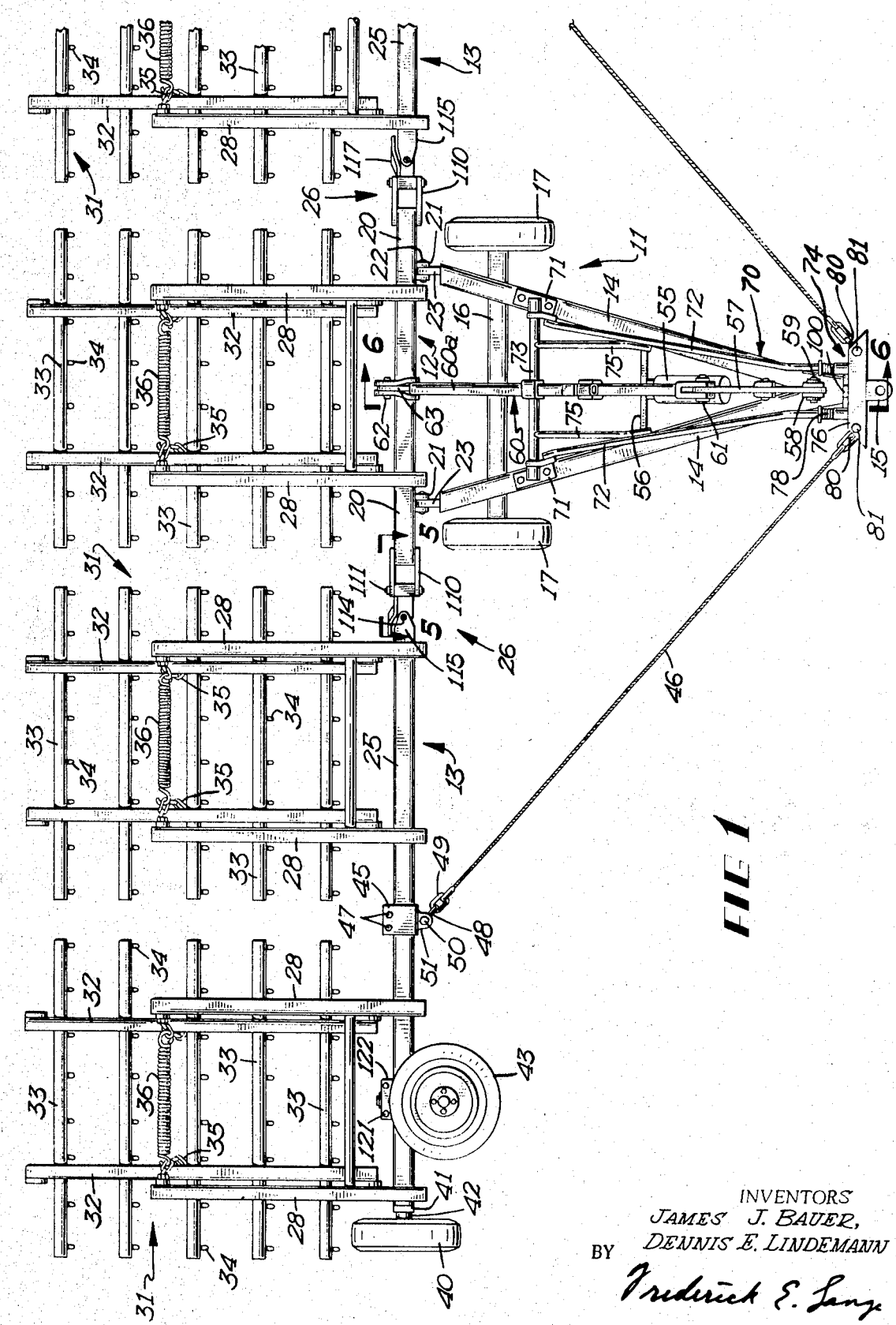

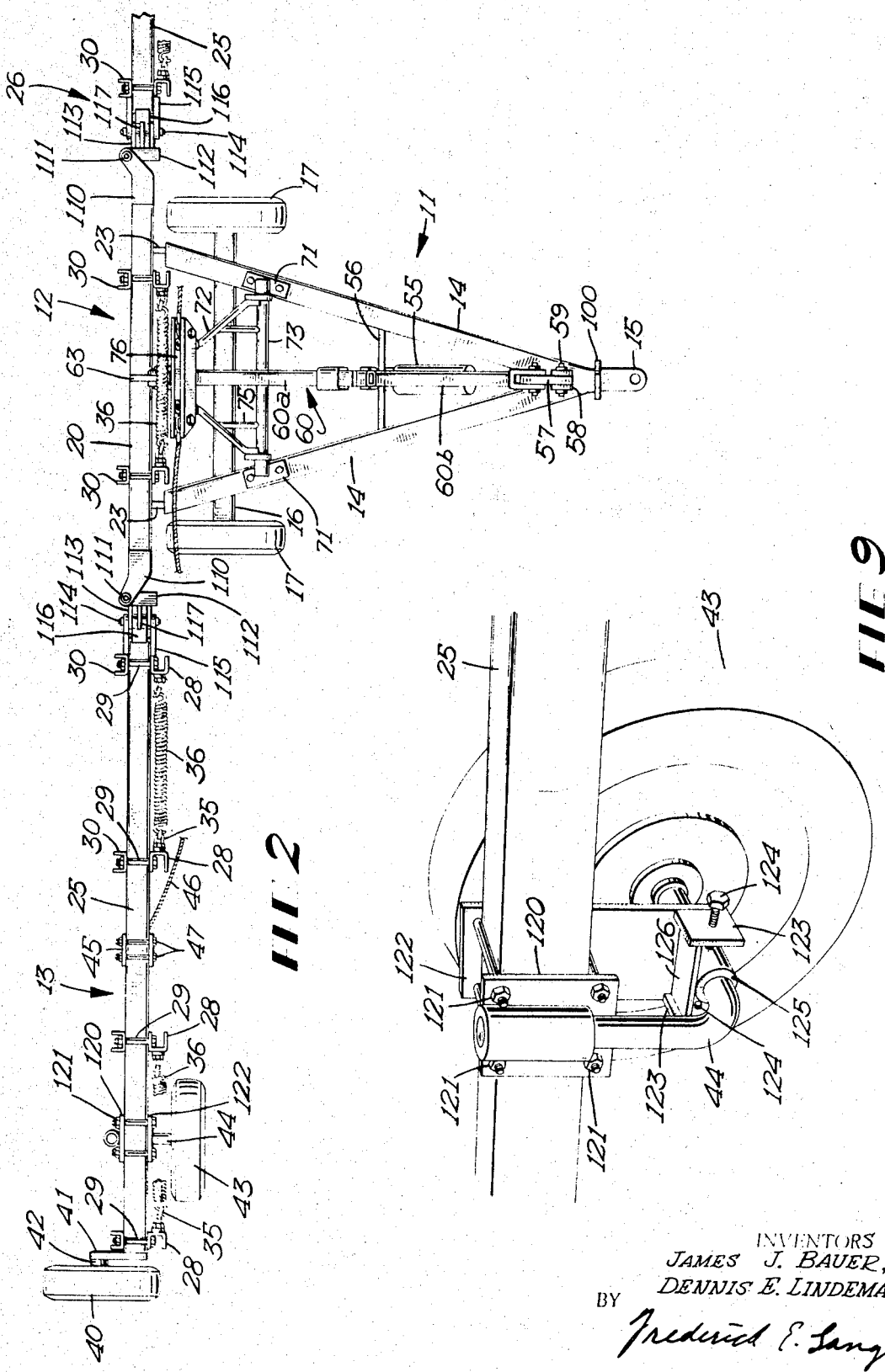

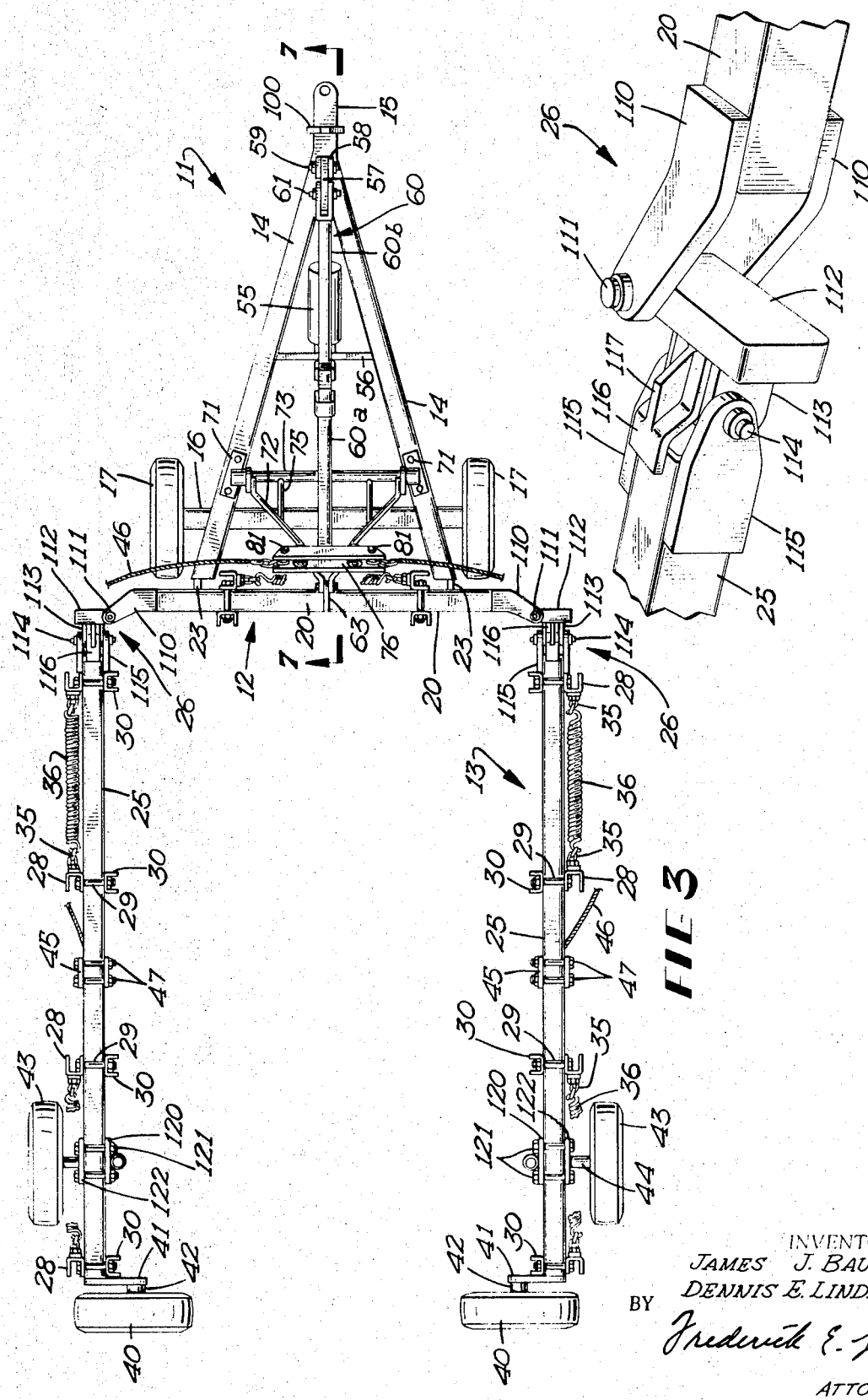

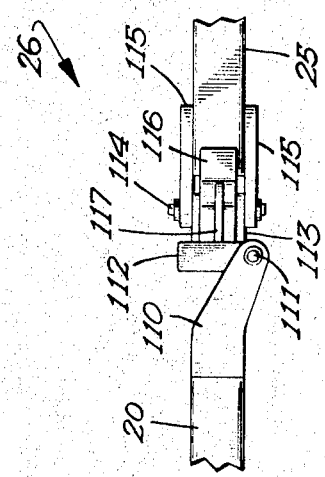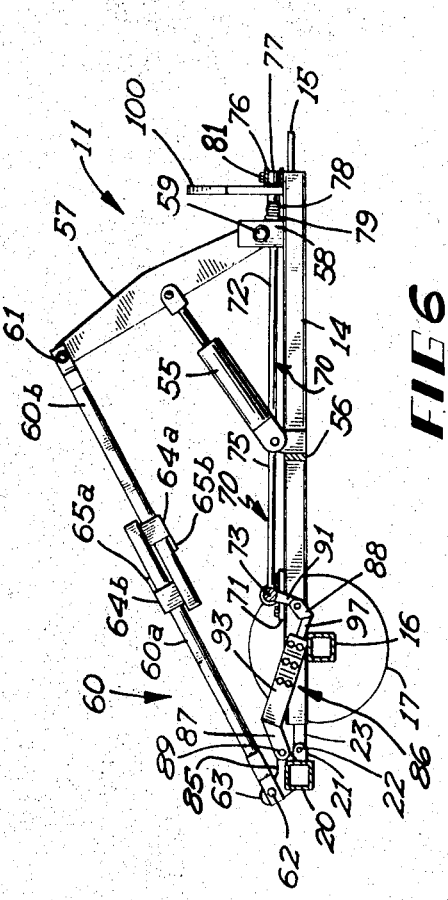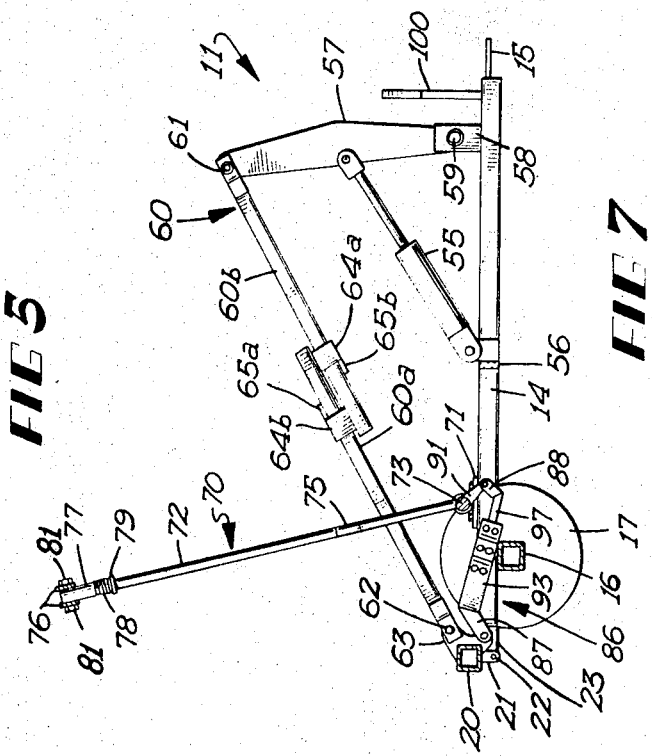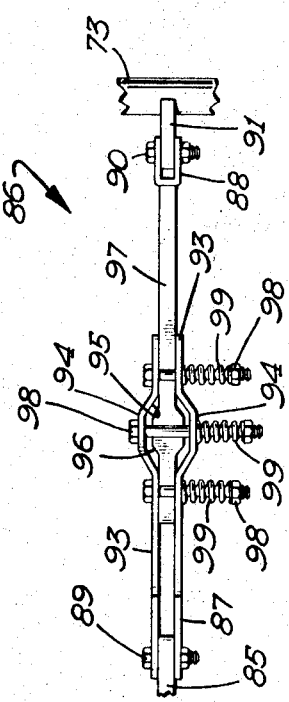

ACTUATING MEANS FOR FOLDABLE IMPLEMENT CARRIAGE

BACKGROUND OF THE INVENTION

The invention pertains to ground working implements and more particularly to foldable racks or carriages for such implements.

In traversing a field for agricultural purposes, such as plowing, discing, harrowing, mowing and cultivating, considerable time and money can be saved by decreasing the number of swaths necessary to cover a given area. In other words, the wider the swath, within limits, the more economical the operation. Consequently, implement carriages have been designed with considerable width, including widths of up to 55—60 feet. While highly desirable for field use, an implement of such width is not transportable on a highway, cannot be pulled through a normal fence gate, and requires an unduly large floor area for storage. Consequently, some method of breaking down the wide carriage into a more compact unit, that is, folding the implement from its field position to a more compact transport position, must be devised to make transport and storage feasible.

Various designs for foldable implement carriages have been proposed and examples of such designs are provided by the following U.S. Pats: Worden No. 2,662,363; Moore No. 2,828,597; and Clark No. 2,944,615. In addition a foldable implement carriage is disclosed in a U.S. Pat. application entitled Automatic Hydraulic Harrow Cart filed by Nelson on Apr. 26, 1966 and assigned Ser. No. 545,492.

In the prior art, movement from the field position to the transport position (and vice versa) has been accomplished hydraulically with no provision for premature actuation of the hydraulic cylinder. More particularly, the hydraulic cylinder has been linked directly to the pivoting transverse beam with no provision made for collapse or compression of the linkage if actuated prematurely. Thus if the hydraulic cylinder of prior art devices is retracted prematurely with the carriage in the transport position, considerable damage results due to collision between the implements mounted to the center beam with those mounted to the wing beams. Either the implements are heavily damaged and bent or the linkage between the hydraulic cylinder and the pivoting center beam is deformed or broken.

In addition, the prior art carriages either require a manual release of the reinforcing bars, cables or chains, which maintain the wing beam sections in their extended field position in alignment with the center beam against the tendency to fold back as the carriage is pulled forward, or provide for automatic release through the provision of cable lifting arms. In the case of manual release (Worden, Moore and Clark patents) the operator must dismount from the towing vehicle to move from the field to transport position, an obvious shortcoming of the design. In the case of automatic release through the provision of cable lifting arms (Nelson application), no provision has been made for relieving the lift arms of compressive forces due to tension in the cables when the carriage is in the field position. The compressive forces applied to the lifting arms require that the lifting arms themselves as well as their mountings be designed to carry such forces, which is a factor which increases cost.

SUMMARY

The present invention solves many of the problems inherent in the prior art. For example, a telescoping link is provided between the hydraulic cylinder and the pivoted transverse beam so that premature actuation of the hydraulic cylinder to move from the transport position to the field position has no damaging effect. In addition, clutch means is provided to prevent pivoting of the cable slackening yoke in the event that the yoke is actuated prematurely, before it is free to pivot upwardly to thereby slacken the cables. Means is also provided for preventing transmission of compressive forces to the cable lifting arms. Thus cable tension, due to the forward movement of the carriage when in the field position, is carried by a tongue mounted stop means and is not transmitted to the cable lifting arms. And finally means is provided for lifting the earth working implements without simultaneous release of the cable to allow forward movement of the carriage when in the field position to clean the implement teeth of debris and other matter.

It is, accordingly, an object to provide a hydraulically actuated carriage movable from a field position to a transport position in which a premature attempt to move the apparatus between field and transport positions does not cause damage or deformation.

It is also an object to provide a hydraulically actuated implement carriage wherein reinforcing cables are provided between the tongue section and the outboard wing beam sections and raised and slackened by means of a cable yoke lift linkage and means is provided for preventing the transmission of compressive forces from the reinforcing cables to the cable lift arms when the carriage is in the field position.

It is also an object to provide a hydraulically actuated carriage movable from a field position to a transport position having reinforcing cables raised and slackened by a cable yoke lift linkage and means for preventing the transmission of compressive forces from the reinforcing cables to the cable lift arms wherein means is also provided for moving the carriage from the field to the transport position, so as to lift the implements carried by the carriage slightly above the ground, without actuating the cable lifting arms to thereby allow forward movement of the carriage to clean debris and other material from the implement teeth.

DESCRIPTION OF THE DRAWINGS

FIG. 1 is a plan view of the present invention and shows the implement carriage in the field position. One of the wing beam sections is only partially shown.

FIG. 2 is a plan view of the invention and shows the implement carriage in the intermediate position. The harrow tooth racks which form the implements associated with the embodiment of the carriage shown are not shown in FIG. 2. One wing beam is only partially shown.

FIG. 3 is a plan view of the invention with the implement carriage in the transport position. The harrow tooth racks are not shown.

FIG. 4 is a perspective view of the universal joint between the center beam and the wing beams and is shown in the intermediate position.

FIG. 5 is a sectional view taken on the line 5–5 of FIG. 1 and shows the universal joint between the center beam and the wing beam in the field position.

FIG. 6 is a sectional view taken on the line 6–6 of FIG. 1 and shows the hydraulic cylinder and linkage for pivoting the center beam and wing beams from the field position to the transport position and also shows the cable lift mechanism. In FIG. 6 the elements are shown in the field position.

FIG. 7 is a sectional view taken on the line 7–7 of FIG. 3 and shows the elements in the transport position.

FIG. 8 is a plan view of the slip clutch which serves in the cable yoke lifting linkage.

FIG. 9 is a perspective view of the transport wheels in the transport position and shows the wheel mounting and means for adjusting the toe-in thereof.

DESCRIPTION OF THE PREFERRED EMBODIMENT

The invention may be generally understood with reference to FIGS. 1, 2 and 3. The foldable carriage has three basic positions: the field position shown in FIG. 1, an intermediate position shown in FIG. 2, and the transport position shown in FIG. 3. It includes a tongue section 11, a center beam section 12, and two wing beam sections 13. Tongue section 11 is wheel mounted and includes a pair of converging frame members 14, hitch 15, and axle 16. Axle 16 is welded to frame members 14 and rotatably supports tongue section wheels 17.

Center beam section 12 includes center beam 20 which is pivotally mounted with its longitudinal axis substantially perpendicular to the direction of travel of tongue section 11. Center beam 20 is pivotally mounted by means of parallel spaced brackets 21 which are pinned at pins 22 to rearwardly extending tabs 23 welded to each of the frame members 14. Thus center beam 20, as will be more particularly described below, may be pivoted about an axis extending through pins 22.

Wing beam sections 13 include a wing beam 25 which is universally pivotally mounted to center beam 20 at universal joint 26. Universal joint 26, described more particularly below, allows a universal pivoting of wing beam 25 with respect to center beam 20 except insofar as pivoting of the joint is limited by structure described in detail below.

Both center beam section 12 and wing beam sections 13 include a number of spaced implement arms 28 which are mounted to center beam 20, in the case of center beam section 12, and to wing beam 25, in the case of wing beam sections 13, by means of connectors 29 and backing channel plates 30, best seen in FIG. 2. In the illustrated embodiment, harrow racks 31 are suspended from implement arms 28. Harrow racks 31 include frame members 32 which serve as a means for mounting harrow tooth mounting members 33 in spaced parallel relationship. Harrow teeth 34 are mounted in spaced relationship in harrow tooth mounting members 33 to serve as ground working implements. Each harrow tooth rack 31 is suspended from a pair of implement arms 28 by means of chains 35. Coil springs 36 are provided to minimize swinging movement of each harrow tooth rack 31 when in the vertical transport position.

It should be understood that harrow tooth racks 31 are but an example of one implement which may be suspended from implement arms 28. Other implements may also be used in connection with the foldable carriage without departing from the scope of the invention.

A field wheel 40 is rotatably mounted on the outer end of each wing beam 25. As best seen in FIG. 2, field wheel 40 is mounted to wing beam 25 by means of mounting plate 41 welded thereto and axle 42 secured to mounting plate 41. Each wing beam 25 is also provided with a transport wheel 43 which is rotatably mounted to wing beam 25 by means of axle 44, in a manner described more particularly below. Field wheels 40 engage the ground and are used when the implement is in the field position, shown in FIG. 1. Transport wheels 43 do not engage the ground when the implement is in the field position, but are used when the carriage is in the transport position shown in FIG. 3.

U-shaped brackets 45 mount a pair of cables 46 to wing beams 25. Cables 46 are secured to wing beams 25 by means of U-shaped brackets 45 which are seated around wing beam 25 and secured thereto by means of connectors 47. A clevis 48 is linked with ring 49 and secured by means of connector 50 to tab 51 of bracket 45 to complete the connection. Cables 46 serve to reinforce the transverse beam, consisting of center beam 20 and wing beams 25, at joints 26 when in the field position and when lifted, as described more particularly below, do not inhibit movement of the carriage from the field position to the transport position when such movement is required.

The carriage is moved from the intermediate to the transport position (FIGS. 2 and 3) merely by forward movement of tongue section 11. With transport wheels 43 in engagement with the ground, forward movement of tongue section 11 causes wing beam section 13 to pivot rearwardly about universal joints 26 and trail behind tongue section 11 in the position shown in FIG. 3. The carriage is moved from the transport position to the intermediate position (FIGS. 2 and 3) by rearward movement of tongue section 11 which causes spreading of wing beam sections 13 in a manner opposite to the movement from the intermediate to the transport position. The carriage is moved between the field position and the intermediate position (FIGS. 1 and 2) by means of a hydraulically actuated linkage described below.

The hydraulically actuated linkage may be best seen in FIGS. 6 and 7. In FIG. 6 the linkage is shown in the field position. In FIG. 7 the linkage is shown in the intermediate and transport position. The linkage includes means for pivoting center beam 20 about the axis extending through pins 22 and it also includes means for raising cables 46 to thereby slacken the cables to allow a rearward pivoting of wing beams 25 at universal joint 26.

The linkage for pivoting center beam 20 includes hydraulic cylinder 55 which is pinned at one end to cross member 56 which extends between frame members 14 of tongue section 11. Hydraulic cylinder 55 is pinned at the other end to a lifting arm 57 which is pivotally connected to frame members 14 of tongue section 11 at bracket 58 by means of pin 59. Lifting arm 57 is accordingly pivotable in a vertical plane perpendicular to the longitudinal axis of center beam 20 about the axis of pin 59. A telescoping tube 60, which includes two similar halves 60a and 60b, extends from pin 61 at lever arm 57 to pin 62 at center beam pivoting bracket 63. Telescoping tube 60 includes sleeve portions 64a and 64b. Stops 65a and 65b are provided to limit the extension of tube 60. While stops 65a and 65b limit the extension of tube 60, it should be noted that they do not limit the contraction of compressive movement of tube 60. As hydraulic cylinder 55 is extended and retracted, lifting arm 57 pivots about pin 58 and, through telescoping tube 60 and center beam pivoting bracket 63, center beam 20 is caused to pivot about the axis extending through pins 22. Thus center beam 20 may be pivoted from the field position shown in FIG. 6 to the transport position shown in FIG. 7 by means of the linkage described. In moving from the field position to the transport position center beam 20 is caused to pivot about the axis extending through pins 22 through an angular distance of about 90° to thereby pivot implement arms 28 from a horizontal plane to a vertical plane.

The telescopic design of tube 60 avoids damage in the event that hydraulic cylinder 55 is retracted with the wing beams 25 in the transport position (shown in FIG. 3). Without the telescoping capacity of tube 60, premature retraction of hydraulic cylinder 55 with wing beams 25 in the transport position, would force center beam section 12 to collide with wing beam sections 13, and damage could also be done to universal joint 26. The telescoping action of tube 60, however, dissipates the force applied by the premature retraction of hydraulic cylinder 55 and prevents damage. When hydraulic cylinder 55 is properly retracted, with wing beams 25 in the intermediate position shown in FIG. 2, center beam section 12 is free to pivot downwardly by gravity as tube 60 moves rearwardly. Center beam section 12 pivots downwardly about the axis of pins 22 an angular distance of about 90° to move from the intermediate position to FIG. 2 to the field position of FIG. 1.

The hydraulic cylinder 55 also serves as a means for raising and lowering cables 46 to thereby allow rearward pivotal movement of wing beams 25 about universal joint 26. For that purpose cable yoke 70, best seen in FIGS. 1, 6 and 7, is pivotally mounted to frame members 14 of tongue section 11 at sleeve brackets 71. Cable yoke 70, includes a pair of cable lift arms 72 which extend from transverse member 73, pivotally mounted in sleeve bracket 71, to yoke assembly 74. A pair of reinforcing members 75 is provided to reinforce the joint between cable lift arms 72 and a cross member 73. Yoke assembly 74 includes a rigid cable mounting link 76 which is slidably mounted to cable lift arms 72 by means of sleeves 77 which are seated on the ends of cable lift arms 72. Coil springs 78 are provided and engage sleeves 77 at one end and flanges 79 at the other end to movably mount yoke assembly 74 to the ends of cable lift arms 72. Cables 46 are attached to cable link member 76 by means of clevises 80 and connectors 81. Cable yoke 70 may be pivoted about the axis of cross member 73 from the field position shown in FIGS. 1 and 6, to the transport position shown in FIGS. 3 and 7 by means of a cable yoke lift linkage described below.

With reference to FIGS. 6—8, the cable yoke lift linkage includes a bracket attachment 85 formed integrally with center beam pivoting bracket 63. Bracket attachment 85 serves as a means for transferring rotational movement of center beam 20 about the axis of pins 22 to slip clutch 86 shown in FIGS. 6—8. Slip clutch 86 includes a pair of angularly offset mounting brackets 87 and 88 on opposite ends thereof. Bracket 87 is pinned at pin 89 to bracket attachment 85. Bracket 88 is pinned at pin 90 to bracket 91 which is welded to pivoting cross member 73 of cable yoke 70. Thus as center beam pivoting bracket 63 is caused to pivot about the axis of pins 22 by the action of hydraulic cylinder 55, force is applied to slip clutch 86 which is in turn applied to bracket 91 to pivot cable yoke 70 about the axis of pivoting cross member 73 from the field position shown in FIG. 6 to the intermediate or transport position shown in FIG. 7.

Slip clutch 86 may be best understood with reference to FIG. 8. It includes a pair of exterior clutch plates 93 each designed with an offset portion 94. The opposing offset portions 94 provide a camming surface 95 which is engaged by a complementary surface 96 formed integrally with clutch rod 97. Clutch rod 97 is welded to bracket 88. A series of connectors 98 extend through exterior clutch plates 93 in three pairs and each pair brackets clutch rod 97. Thus clutch rod 97 is free to slide in slip clutch 86 but is not otherwise free to pivot or rotate therein. Springs 99 are provided in association with connectors 98 to apply compressive force on clutch rod 97 through exterior clutch plates 93. Springs 99 allow a lateral expansion of the two exterior clutch plates 93. In the event that compressive force is applied to slip clutch 86 without a transfer of the force through movement of clutch rod 97 the clutch slips. In other words, if slip clutch 86 is actuated and clutch rod 97, due to its inability to move cable yoke 70, cannot move, the cam surface 96 of clutch rod 97 causes lateral expansion of exterior clutch plates 93 as it engages cam surface 95 and the force applied to slip clutch 86 is dissipated.

Stop 100 serves to prevent the transmission of compressive forces to cable lift arms 72. The stop 100 is in the form of an upstanding plate rigidly secured to the frame 14. When the cable yoke is in the position shown in FIGS. 1 and 6, the yoke link 76 is on the opposite side of the stop 100 from the center beam section 12 so that tension in cables 46 is transmitted to the stop 100. Tension in cables 46, due to forward movement of tongue section 11 with the carriage in the field position shown in FIG. 1, causes coil springs 78 to compress and cable mounting link 76 engages stop 100. Thus, as pointed out above, the tensile force in cables 46 is balanced by compression against stop 100 and no compressive force (except the slight force necessary to compress springs 78) is transmitted to lifting arms 72.

The dissipating action of slip clutch 86 described above, serves as a means for avoiding damage if hydraulic cylinder 55 is actuated while tension remains in cables 46. With tension in cables 46, cable yoke link 76 engages cable yoke link stop 100, as springs 78 are compressed, as best seen in FIG. 1. With cable yoke link 76 in compressive engagement with stop 100, considerable frictional forces are developed which cannot be overcome by force applied to link 91 (a comparatively short lever arm) through slip clutch 86. In such a situation, slip clutch 86 serves as a means for dissipating forces which would otherwise cause a break or deformation in the linkage between center beam pivoting bracket 63 and cable yoke 70.

It should be noted that the slip clutch 86 has a "lag" designed into it which is represented by the distance between cam surfaces 95 and 96. Thus clutch rod 97 is free to slide longitudinally of exterior clutch plates 93 for an appreciable distance before cam surface 96 engages cam surface 95. The "lag" allows a lifting of implement arms 28 from the field position through a small angle without applying force to clutch rod 97 (even though slip clutch bracket attachment 85 rotates about the axis of pins 22). Thus the harrow teeth 34 may be lifted slightly above the ground and tongue section 11 can be pulled in a forward direction, with tension in cables 46, without applying any force to cable yoke 70. By following the foregoing procedure, the harrow teeth 34 may be cleaned of debris as the carriage is driven forward with the harrow teeth raised slightly above the ground.

Universal joint 26 may be best understood with reference to FIGS. 3—5. With reference particularly to FIG. 4, universal joint 26 includes offset brackets 110 which are welded to center beam 20 and serve to position pin 111 in a vertical position offset rearwardly of the axis of center beam 20 when the latter is in the intermediate or transport position shown in FIGS. 2—4. Universal joint 26 includes an intermediate block 112 which accepts pin 111 at one end and provides a means for mounting brackets 113 which in turn accept pin 114 with its axis extending perpendicularly to the axis of pin 111. Brackets 115 are welded to wing beam 25 to pivotally connect wing beam 25 to universal joint 26 at pin 114. Thus, wing beam 25 may be universally pivoted with respect to center beam 20 since it may pivot in a horizontal plane about the axis of pin 111 and in a vertical plane about the axis of pin 114.

Pivotal movement about pin 114, however, is limited by the presence of plate 116 which serves as a means at universal joint 26 for limiting the pivotal movement of wing beam 25 about the horizontal axis of pin 114, when center beam 20 is in the intermediate or transport position. Plate 116 is welded to intermediate block 112 and brackets 113 and further rigidity is provided by rib 117. Thus any attempt to pivot wing beam 25 about the axis of pin 114 toward plate 116 will result in an engagement between the wing beam 25 and plate 116. Plate 116 thus serves as a stop to prevent such pivotal movement of wing beam 25.

The transport axle may be best understood with reference to FIG. 9. Transport wheel 43 is rotatable on axle 44 which is pivotally mounted to wing beam 25 by means of sleeve bracket 120. Sleeve bracket 120 is secured to wing beam 25 by means of connectors 121 and backing plate 122. Backing plate 122 extends downwardly, when wing beam 25 is in the transport position, a distance sufficient to extend beyond axle 44 which is accommodated by an opening (not shown) in plate 122. Backing plate 122 serves as a means for mounting stop plates 123 which are threadably engaged with stop screws 124. A bushing 125 rotatably engages axle 44 and rests against bearing plate 126. Axle 44, accordingly, may be adjusted for toe-in by means of stop screws 124. In other words, the angle between the axis of rotation of transport wheel 43 and the axis of wing beam 25 may be varied from the perpendicular within a range of roughly 85 to 95° by the adjustment of stop screws 124. The toe-in adjustment controls the angle between center beam 20 and wing beams 25 when the latter trail behind center beam 20 with the invention in the transport position.

OPERATION

While the general operation of the present invention is apparent from the foregoing description, the more detailed aspects of operation are explained below.

FIELD TO TRANSPORT POSITION

To move from the field position (FIG. 1) to the transport position (FIG. 3), the carriage is first backed-up slightly to slacken cables 46. The slackening of cables 46 removes the compressive force applied to springs 78, permitting them to move cable yoke link 76 from engagement with stop 100. Hydraulic cylinder 55 is then extended to pivot lifting arm 57 upwardly about pin 59 from the position shown in FIG. 6 to the position shown in FIG. 7. As hydraulic cylinder 55 is extended telescoping tube 60 pivots center beam 20 about the axis of pins 22 from the position shown in FIG. 6 to the position shown in FIG. 7. As center beam 20 is pivoted about the axis of pins 22, wing beams 25 also pivot about the same axis and field wheels 40 are disengaged from the supporting surface as transport wheels 43 pivot downwardly to engaged the supporting surface. Harrow racks 31 move from the horizontal position shown in FIG. 1 to the vertical position shown in FIG. 2.

Simultaneously, compressive force is applied to slip clutch 86 at slip clutch bracket 85. The compressive force is transmitted through slip clutch 86 to bracket 91 welded to pivoting cross member 73 of cable yoke 70. Cable yoke 70 is pivoted upwardly from the position shown in FIG. 6 to the position shown in FIG. 7 to raise and further slacken cables 46.

At this point the carriage is in the intermediate position shown in FIG. 2. As tongue section 11 is drawn forward, wing beam sections 13 pivot about pins 111 of universal joint 26 and eventually assume the trailing position shown in FIG. 3. With wing beam sections 13 in the trailing position, movement from the field position to the transport position is complete.

In the event that an attempt is made to move from the field position to the transport position without first backing up slightly to slacken cables 46, slip clutch 86 prevents damage to the cable yoke lift linkage. A failure to slacken cables 46 leaves cable yoke link 76 in engagement with stop 100 and cable yoke 70 is therefore not free to pivot upwardly about the axis of pivoting cross member 73. Accordingly, as hydraulic cylinder 55 is extended and as force is applied to slip clutch 86, that force cannot be dissipated by causing cable yoke 70 to pivot upwardly. In the absence of slip clutch 86, a failure in the cable yoke lift linkage would probably occur at bracket 91, a short lever arm compared to the lever arm of cable yoke 70. With the provision of slip clutch 86, however, when cable yoke 70 is not free to pivot upwardly, force applied to slip clutch 86 is dissipated as clutch rod 97 forces clutch plates 93 laterally apart and slips. Thus, slip clutch 86 prevents damage in the event of operator error.

TRANSPORT TO FIELD POSITION

To move from the transport position (FIG. 3) to the field position (FIG. 1) the carriage is first backed-up a substantial distance to spread wing beam sections 13 from the trailing position shown in FIG. 3 to the intermediate position shown in FIG. 2. Hydraulic cylinder 55 is then retracted to move lifting arm 57 from the position shown in FIG. 7 to the position shown in FIG. 6. Telescoping tube 60 releases center beam 20 from the transport position of FIGS. 2 and 7 and center beam 20 pivots downwardly about the axis of pins 22 to the position shown in FIG. 6. The downward pivoting of center beam 20 is caused by gravity acting primarily upon harrow rack 31 suspended from implement arms 28 mounted to center beam 20. As center beam 20 pivots about the axis of pins 22, wing beams 25 also pivot about the same axis. Field wheels 40, accordingly, are pivoted into engagement with the supporting surface and transport wheels 43 are pivoted out of engagement with the supporting surface. As center beam 20 pivots, tensile force is applied to slip clutch 86 and that force is transmitted to bracket 91 which causes cable yoke 70 to pivot downwardly about the axis of pivoting cross member 73 from the position of FIG. 7 to the position of FIG. 6. At this point, movement from the transport position to the field position is complete.

In the event that an attempt is made to move from the transport position to the field position without first backing up a distance sufficient to spread wing beam sections 13 from the trailing position shown in FIG. 3 to the intermediate position shown in FIG. 2, telescoping tube 60 prevents damage. In the absence of telescoping tube 60, the retraction of hydraulic cylinder 55 would apply a compressive force to center beam pivoting bracket 63 and force center beam section 12 to pivot downwardly about the axis of pins 22. With the carriage in the transport position shown in FIG. 3, center beam section 12 would be forced to collide with wing beam sections 13 and harrow racks 31 would be damaged. Moreover, universal joints 26 would be deformed since the compressive force would tend to pivot universal joint 26 about pin 114 which is prevented by plate 116. The telescopic feature of link 60 prevents such an occurrence since it transmits no compressive force to center beam pivoting bracket 63 as hydraulic cylinder 55 is retracted. If center beam 20 is not free to pivot downwardly about the axis of pins 22 as hydraulic cylinder 55 is retracted, telescopic link 60 merely compresses as sleeve member 64a and 64b slide on halves 60a and 60b, respectively, of telescoping tube 60. Thus, the force transmitted by hydraulic cylinder 55 through lifting arm 57 is dissipated so that damage to harrow racks 31 and universal joints 26 is prevented if, through operator error, hydraulic cylinder 55 is prematurely retracted.

USE

When in use, in the field position, a number of the features described above find application. The provision of stop 100 prevents compression loading of cable yoke 70, since springs 78 compress to allow an engagement between cable yoke link 76 and stop 100 and the force exerted by the cables is transmitted directly to the stop 100.

Also, when in use in the field position, harrow tooth racks 31 may be raised slightly without slackening cables 46. Thus, the carriage may be pulled forwardly with harrow tooth racks 31 raised slightly above the ground to clean debris and other material from the teeth. Such cleaning of the teeth is possible due to the lag designed into slip clutch 86. More particularly, cam surfaces 95 of exterior clutch plates 93 are spaced longitudinally a greater distance than the longitudinal distance between cam surfaces 96 permitting a limited amount of movement of center beam 20 and clutch plates 93 before any movement of clutch rod 97 takes place. Thus center beam 20 may be pivoted to raise implement arms 28 and harrow tooth racks 31 a limited amount without causing movement of clutch rod 97 and pivotal movement in cable yoke 70.

Various changes and modifications may be made in the embodiment shown and described without departing from the scope of the invention.

We claim:

1. A foldable carriage for an earth working implement comprising:
   a wheel mounted tongue section;
   a center beam mounted to said tongue section for pivotal movement about a horizontal axis transverse to the longitudinal axis of said tongue section;
   a pair of wing beams respectively pivotally mounted to each end of said center beam to thereby define a universal joint at each end thereof;
   actuating means mounted to said tongue section and operatively connected to said center beam for pivoting said center beam about said horizontal axis through an angular distance of substantially 90° to thereby define a field position and a transport position;
   an elongate member mounted to said tongue section for pivotal movement about an axis transverse to the longitudinal axis of said tongue section comprising a yoke member having means forming an apex at said arcuately movable end thereof;
   flexible members extending from the arcuately movable end of said elongate member to a mounting point on each of said wing beams spaced from said universal joint;
   linkage means extending between said actuating means and said elongate member for pivoting said elongate member between a substantially horizontal plane upwardly and rearwardly to thereby define a field position and a transport position of said elongate member;
   said flexible members having a length equal to the distance from said arcuately movable end of said elongate member to said mounting point on each of said wing beams when said elongate member and carriage are in said field position;
   stop means rigidly secured to said tongue section and engaging the apex-forming means of said yoke member for preventing compressive loading of said elongate member when said elongate member and carriage are in said field position; and
   a wheel mounted to each of said wing beams at a point spaced from said universal joint for supporting each of said wing beams.

2. The foldable carriage of claim 1 wherein said stop means comprises a rigid upstanding member mounted to said tongue section.

3. The foldable carriage of claim 2 wherein said apex-forming means of said yoke member is yieldably mounted for movement in a direction toward said axis transverse to the longitudinal axis of said tongue section into engagement with said stop means.

4. A foldable carriage for an earth working implement comprising:
- a wheel mounted tongue section;
- a center beam mounted to said tongue section for pivotal movement about a horizontal axis transverse to the longitudinal axis of said tongue section;
- a pair of wing beams respectively pivotally mounted to each end of said center beam to thereby define a universal joint at each end thereof;
- actuating means mounted to said tongue section and operatively connected to said center beam for pivoting said center beam about said horizontal axis through an angular distance of substantially 90° to thereby define a field position and a transport position;
- an elongate member mounted to said tongue section for pivotal movement about a horizontal axis transverse to the longitudinal axis of said tongue section;
- flexible members extending from the arcuately movable end of said elongate member to a mounting point on each of said wing beams spaced from said universal joint;
- linkage means associated with said actuating means for pivoting said elongate member between a substantially horizontal plane upwardly and rearwardly about said horizontal axis to thereby define a field position and a transport position of said elongate member, said linkage means including a slip clutch comprising a clutch rod disposed between a pair of clutch plates offset mounted, respectively, to said center beam and said elongate member, said clutch plates and said clutch rod having complementary, cammed surfaces engagable during operation thereof;
- said flexible members having a length equal to the distance from said arcuately movable end of said elongate member to said mounting point on each of said wing beams when said elongate member and carriage are in said field position; and
- a wheel mounted to each of said wing beams at a point spaced from said universal joint for supporting each of said wing beams.

5. The foldable carriage of claim 4 wherein said slip clutch includes means for allowing limited movement of said center beam before force is transmitted from said center beam to said elongate member.